L. M. LYMBURNER.
HARNESS SUSPENSION BAR.
APPLICATION FILED JAN. 14, 1915.

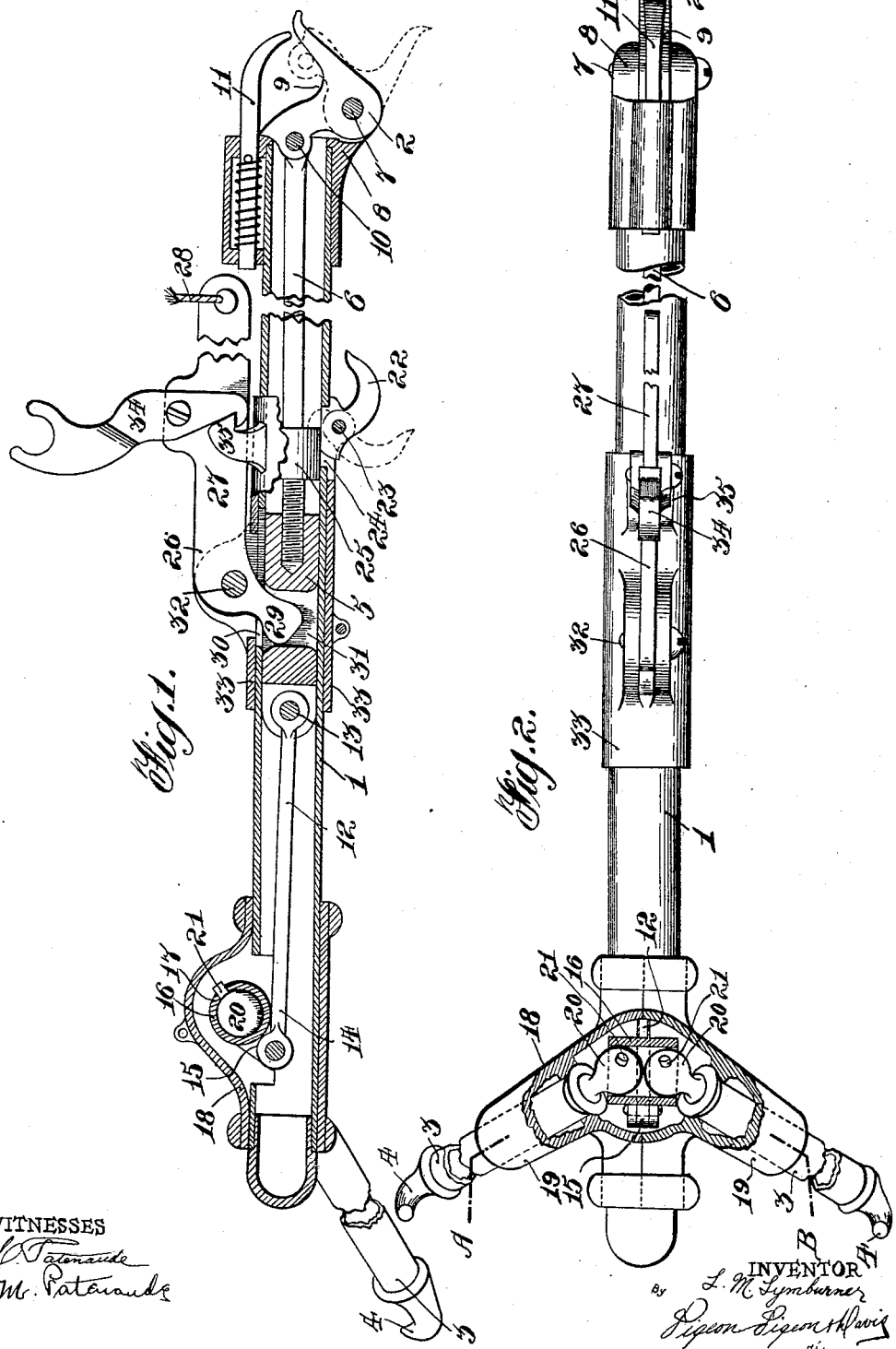

1,177,643.

Patented Apr. 4, 1916.
2 SHEETS—SHEET 2.

WITNESSES
C. Patenaude
Mo. Patenaude

INVENTOR
L. M. Lymburner,
By
Eugene Pigeont Davis
Attorneys

UNITED STATES PATENT OFFICE.

LOUIS MARCEL LYMBURNER, OF MONTREAL, QUEBEC, CANADA.

HARNESS-SUSPENSION BAR.

1,177,643.   Specification of Letters Patent.   Patented Apr. 4, 1916.

Application filed January 14, 1915. Serial No. 2,200.

*To all whom it may concern:*

Be it known that I, LOUIS MARCEL LYMBURNER, a subject of the King of Great Britain, and residing at the city of Montreal, in the Province of Quebec, in the Dominion of Canada, have invented certain new and useful Improvements in Harness-Suspension Bars; and I do hereby declare that the following is a full, clear, and exact description of the same.

The invention relates to a "harness suspension bar" particularly adapted for use in fire stations and usually suspended by a cable from a spring operated ceiling hanger, the device being for the purpose of maintaining the harness in a position where it can be quickly released by trip mechanism on the hanger for positioning the harness on the draft animals.

It has hitherto been proposed to provide a rigid suspension bar having movable harness engaging hooks at its ends operated to release the harness by tripping mechanism carried intermediate of the bar, but such devices have proved inefficient in regard to the hook operating means which have been found to easily get out of order.

It is therefore the purpose of the present invention to devise a means for positively operating the hooks in which no gears are used or similar devices liable to quickly deteriorate.

A further object of the invention is to devise hook releasing means of a simple character, easy to assemble and wherein there is no liability to jam.

The invention is shown in the accompanying drawings in which—

Figure 3:
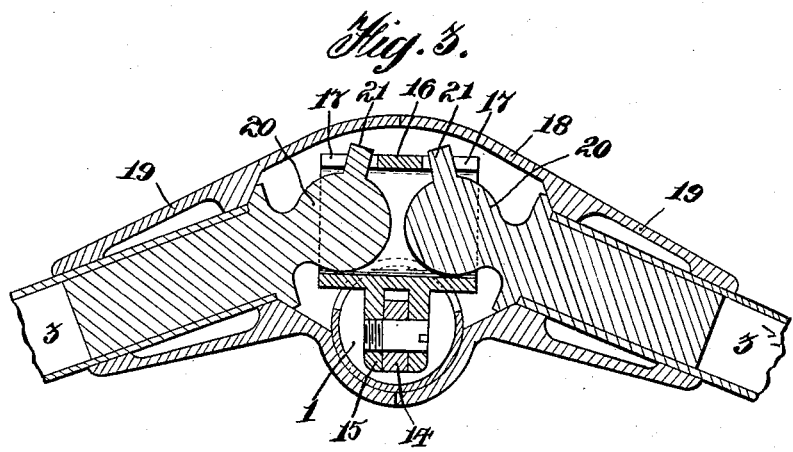
Figure 4:
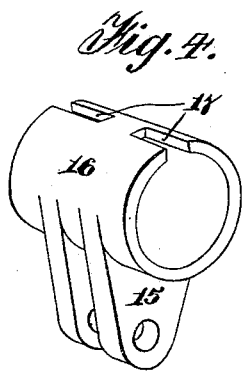

Figure 1 is a longitudinal sectional elevation of the device, Fig. 2 is a plan view partly in section. Fig. 3 is an enlarged sectional view on the dotted line A—B Fig. 2, and Fig. 4 is an enlarged perspective view of a crank lever forming part of the mechanism for operating the rear hooks.

The general shape of the bar is as usual, that is to say, it comprises a rigid straight tube 1 terminating in a movable hook 2 at the front end and in diverging downwardly slanting arms 3 at the rear end, each ending in a suspension hook 4.

5 is a sliding block adapted to be reciprocated within the tube 1 by the means hereinafter described.

6 is a rod extending forwardly from the forward end of the block 5 through the tube 1 to the hook 2. The latter is in the nature of a bell crank lever pivoted at 7 in a lug 8 rigidly secured in the forward end of the tube 1, thus forming the recess 9 in which the harness engages. The forward end of the rod 6 is pivotally connected at 10 to the rear section of the hook 2 so that as the block 5 slides forwardly, the hook will be rocked on its pivot 7 until the recess 9 is in such a position as to permit the harness to fall therefrom.

11 is a spring pressed retaining pawl carried by the lug 8 to form a closure over the recess 9 when the harness is hung therein.

Extending rearwardly from the block 5 is a pitman 12 pivoted at 13 to the block and at its rear end 14 to the lower end of a crank 15 whose other end is in the form of a sleeve 16 having a slot 17 extending inwardly from each end.

18 is a hollow fork shaped casing rigidly mounted on the rear end of the tube 1, the center portion of which incloses the crank 15 with its sleeve 16, while the downwardly slanting and diverging arms 19 thereof form journal bearings for the rotating arms 3. The upper end of each of these arms terminates in a ball head 20 entering the adjacent open end of the sleeve 16, each of said heads having a laterally projecting pin 21 passing through the adjacent slot 17. It will now be seen that as the block 5 is pushed forwardly to tip the hook 2, it will at the same time rock the crank 15 and by reason of the engagement of the pins 21 with the slots 17, each of the arms 3 will be rotated and the hooks 4 turned downwardly, causing the harness at this end of the suspension bar to slip off its hooks. Of course, the journaling of the arms 3 in the casing 18 is such that they are allowed to rotate, but prevented from moving in a longitudinal direction and for the sake of lightness, these arms are preferably formed of tubes in the ends of which the hooks 4 and heads 20 are rigidly secured.

When a saddle is used with the harness, it is hung on a rocking hook 22 intermediate of the tube 1, this hook being pivoted at 23 and having a tail piece extending into a slot 24 in the underside of the tube 1 to be engaged by a collar 25 on the rod 6. When the block 5 and consequently the rod 6 are in the harness holding position, the tail piece of the hook 22 rests against the underside of the block 5 consequently keeping the hook in its retaining position, but as these parts move forwardly for releasing the harness, the collar 25 slides past the tail piece permitting the latter to swing into the tube 1 as shown in dotted lines and thus causing the saddle to slip from the hook 22. As the block 5 slides back, the collar 25 pushes the tail piece down again and tips the hook to the retaining position again.

The mechanism for reciprocating the block 5 comprising a bell crank lever 26 having a long section 27 to the forward end of which the suspension cable 28 is connected, and a short section 29 extending through a slot 30 in the bar 1 into a slot 31 intermediate of the length of the block 5, the said lever 26 being pivoted at 32 in a sleeve 33 surrounding and reinforcing the intermediate portion of the tube 1. The lever 26 is held with its section 27 down and consequently with the block 5 in a rearward position by means of a trigger 34, whose hooked lower end engages a staple 35 forming a rigid projection from the sleeve 33. The upper end of the trigger 34 has a notch into which is engaged a loop on the reins.

The operation of the device is as follows:—The harness being attached to the hooks 2, 4 and perhaps 22 and the trigger caught to the staple 35, the device is balanced in the horizontal position shown. A sharp pull on the reins releases the trigger 34 from the staple 35 and the section 27 of the lever 26 will then assume a vertical position causing the block 5 to be pushed forward by the section 29 and the hooks to assume their releasing position as hereinbefore described. When it is desired to rehang the harness, the lever 26 is pulled down again until the trigger engages the staple 35, this movement obviously throwing the block 5 back again and bringing the hooks to their proper position for hanging the harness.

It is preferable to connect the rod 6 to the block 5 by a simple screw thread engagement as shown in order that the said rod may be rotated to take up slack, if desired.

Attention is particularly called to the fact that the sleeve 33 is in the form of a clip adjustable on the bar 1, while the slot 30 in the bar adjacent to the clip is wider than necessary in order to permit the clip and the lever 26 carried thereby to be twisted a short distance around the bar in either direction when required. The lever 26 will of course always be in a vertical plane, but when double harness is used, it is not desirable that this plane bisects the angle formed by the oppositely extending arms 3, for the reason that one of the arms 3 must hang higher than the other to permit the horse to pass beneath it. Now it will be obvious that there must be right and left hand bars, one to permit the one horse to pass under from the right hand side and the other to permit the other horse to pass under from the left hand side. Also for single harness, a bar must be arranged in which the vertical plane of the lever 26 bisects the angle formed by the arms 3, and hitherto, it has been usual to make three separate and differently constructed bars for these purposes. There is therefore the great advantage in the present invention that this suspension bar can be so adjusted that it will answer for a right or left hand bar or for a single harness bar, this being accomplished by merely twisting the sleeve 33 around the bar as aforesaid so as to cause the arms 3 to hang at any desired angle in relation to the vertical plane of the lever. In turning the sleeve as aforesaid, the block 5, lug 8 carrying the hook 2, and the pitman 12 and crank 15 with its sleeve 16, will all be correspondingly twisted without in any way spoiling the effective operation of the arms 3 from the reciprocation of the pitman. Of course this twisting movement is only very little and can be to either side of the center, the ball heads 20 permitting the sleeve 16 (which engages them loosely) its necessary twisting movement. The lug 8 is also in the form of a clip so as to be adjustable, but the casing 19 is preferably in two connected halves as clearly shown in Fig. 2 in order to easily assemble the parts.

What I claim is:—

1. In a device of the class described, a rigid tube, a movable hook at the forward end of said tube, angularly extending opposite arms at the rear of said tube, a sliding block within said tube, means for moving the forward hook by the sliding of said block, lever connections between said arms and block for rotating the former by the sliding of the latter and means for sliding said block.

2. In a device of the class described, a rigid tube, a movable hook pivoted at the forward end of said tube, angularly extending opposite arms terminating with a hook and suitably journaled at the rear of said tube, a sliding block within said tube, a rod operatively connecting said block and forward hook, a crank on the inner ends of said arms, a pitman connecting said crank and block and means for sliding said block.

3. In a device of the class described, a rigid tube, a hook pivoted to the forward end of said tube, a pair of angularly extending opposite arms journaled to rotate at the rear end of said tube and each terminating in a hook, a saddle hook pivoted to an intermediate part of said bar, a sliding block and forward hook within said tube, means operatively connecting said block and forward hook, lever connections between said arms and block for rotating the former by the sliding of the latter, a collar slidable with said block for tripping the saddle hook and means for sliding said block.

4. In a device of the class described, a rigid tube, a hook pivoted at the forward end of said tube, a pair of angularly extending opposite arms at the rear of said tube each terminating in a hook, a saddle hook pivoted to the underside of said tube at an intermediate part and having a tail extending into a slot in the tube, a sliding block within said tube and a collar movable therewith arranged to keep said tail down in one position of the block and allow it to swing to tip the hook in the other position of the block, means operatively connecting said block and forward hook, means operatively connecting said block and arms for rotating the latter from the sliding movement of the former and means for sliding said block.

5. In a device of the class described, a rigid tube, a movable hook at the forward end of said tube, angularly extending opposite arms each terminating in a hook and rotatably supported at the rear end of said tube and each terminating at its other end in a rounded head with a rigid pin projecting laterally therefrom, a crank having a sleeve into the opposite ends of which said heads extend, said sleeve having a longitudinal slot in each end engaged by one of said pins, a block slidable within said tube, means for moving the forward hook by the sliding of said block, a pitman connecting said block and crank, and means for sliding said block.

6. In a device of the class described, in combination, a rigid tube, a movable hook at the forward end of said tube, angularly extending opposite arms each terminating in a hook and rotatably supported at the rear end of said tube and each terminating at its other end in a rounded head with a rigid pin projecting laterally therefrom, a crank having a sleeve into the opposite ends of which said heads extend, said sleeve having a longitudinal slot in each end engaged by one of said pins, a block slidable within said tube, means for moving the forward hook by the sliding of said block, a pitman connecting said block and crank, a bell crank lever pivoted to the upper side of said tube and having a short end extending through a slot in said tube and into a slot in said sliding block, and releasable catch means for retaining said lever in one thrown over position.

7. In a device of the class described, a rigid tube, a movable hook at the forward end of said tube, angularly extending opposite arms at the rear end of said tube, a sliding block within the tube, means for sliding said block, a pitman extending rearwardly from said block and a connection between said pitman and the inner ends of said arms whereby the latter may be simultaneously rotated by the reciprocation of the pitman.

8. In a device of the class described, a rigid hollow member having a slot intermediate of its length, a reciprocable block within said member, a sleeve adjustably clamped to said member adjacent to said slot, means carried by said sleeve for reciprocating said block, a movable hook at the forward end of said member and means for moving it by the reciprocation of said block, a pair of opposite angularly extending arms at the rear end of said member terminating in hooks, and a connection between said block and the inner ends of said arms for rotating the latter consequent upon the reciprocation of the block and permitting a slight twisting movement of said sleeve and block in relation to the arms for the purpose herein set forth.

9. In a harness suspension bar, a rigid tube having a slot intermediate of its length, a reciprocable block within said tube, a sleeve surrounding said tube adjacent to said slot, a bell crank lever pivoted in said sleeve and having one section extending through said slot into engagement with the block, the rocking of said bell crank lever being arranged to reciprocate said block, a staple on the sleeve, a pawl or trigger carried by said sleeve and adapted to engage said staple to hold the lever in one thrown over position, a movable hook at the forward end of said tube and means for moving said hook consequent upon the reciprocation of said block, opposite angularly extending arms supported at the rear end of said tube and each terminating in a suspension hook and lever connections between said block and the inner ends of said arms for rotating the latter consequent upon the reciprocation of said block.

Signed at Montreal, Quebec, Canada, this 6th day of October, 1914.

LOUIS MARCEL LYMBURNER.

Witnesses:
 M. Patenaude,
 C. Patenaude.

Copies of this patent may be obtained for five cents each, by addressing the "Commissioner of Patents, Washington, D. C."